Figure 1:
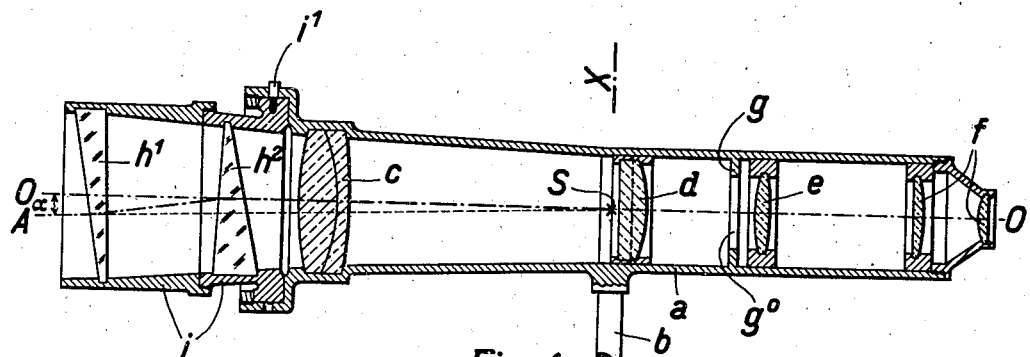

July 18, 1933.  A. KÖNIG  1,918,548
TACHEOMETRIC TELESCOPE
Filed April 13, 1931  2 Sheets-Sheet 1

Inventor:
Albert König

July 18, 1933.  A. KÖNIG  1,918,548
TACHEOMETRIC TELESCOPE
Filed April 13, 1931   2 Sheets-Sheet 2

Inventor:
Albert König

Patented July 18, 1933

1,918,548

UNITED STATES PATENT OFFICE

ALBERT KÖNIG, OF JENA, GERMANY, ASSIGNOR TO THE FIRM CARL ZEISS, OF JENA, GERMANY

TACHEOMETRIC TELESCOPE

Application filed April 13, 1931, Serial No. 529,776, and in Germany April 17, 1930.

The invention concerns a tacheometric telescope which, for producing double images of a measuring staff located at the point to be aimed at, is so constructed that at least part of the oncoming rays are deviated by a fixed amount when leaving the objective, whereby this deviation may be caused for example by employing as an objective a lens system intersected in halves which are displaced relatively to each other by a fixed amount along the section plane or by fixedly providing in front of the objective a special deviating means.

The known tacheometric telescopes of this kind generally have the vertex of the parallactic angle at that spot at which the deviation of the rays takes place so that to the determined distance of the measuring staff has to be added a distance value equal to the distance of the said vertex from the vertical axis of the telescope. The invention makes the described tacheometric telescope an anallatic one by providing in front of the telescope fixed optical members which are so constructed that they cause the vertex of the parallactic angle to be displaced into the vertical axis of the telescope.

If the deviation of the rays is effected according to the second of the said two cases by a deviating device fixedly disposed in front of the objective of the telescope, it is advisable to have the deviating device itself so constructed that it causes the said vertex displacement. As suitable deviating devices, allowing such vertex displacement are to be considered, for instance, two wedges fixedly provided in the direction of the light one behind the other which have an air space between them and whereof, in order to avoid chromatic errors, one is suitably of flint and the other of crown glass, or a fixed wedge of a great thickness which is conveniently given an inclined position.

Regardless of whether the deviation of the rays is effected according to the first or to the second of the two cases, the vertex displacement can be attained also by using in front of the telescope such optical members as permit the incident rays to leave in such a manner that they are so displaced as to remain parallel. Specially suitable for this purpose is for instance an obliquely mounted planoparallel plate or a wedge system of two equal wedges of opposite deviations positioned in the light direction one behind the other and having an air space between them.

If each of the two halves of the objective is made available for the production of one of the two images of the measuring staff and if only those rays are deviated which participate in producing one of the two images, it is advisable to dispose the optical members displacing the rays parallel to themselves in front of that objective half which corresponds to the image to be produced by deviation of rays. However, it would be also possible, though the effect would be not as good, to have these optical members in front of the other half of the objective, in which case a parallel displacement would be imparted to that side of the parallactic angle which, if the said optical members were not given the just mentioned position, would coincide with the optical axis of the telescope (because the rays would pass this objective half without deviation). In this case, however, the vertex of the parallactic angle would permit of being exactly displaced into the vertical axis only when there is concerned a tacheometric telescope to be used together with vertical measuring staves, whereby the said optical members displacing the rays parallel to themselves would have to be disposed in front of one of the two halves in which the objective is divided by a vertical section along the optical axis of the telescope.

When the deviation of the rays is effected by displacing the two halves of an intersected objective and also when the deviation is effected by means of a special deviating device in front of one of the two halves of an undivided objective, it is advisable in that case in which the deviation concerns only those rays which are conducted to one of the two objective halves to so position the optical members effecting the deviation and the optical members effecting the said displacement of the vertex of the parallactic angle (whereby, according to what is said above, the deviation and the vertex displacement can be effected as well by the same optical members) that they allow of being turned by 180° about the optical axis of the telescope. When using tacheometric telescopes of the most simple type which can be turned only horizontally and are used in conjunction with vertical measuring staves, this arrangement permits of employing measuring staves of reduced length.

Figure 2:
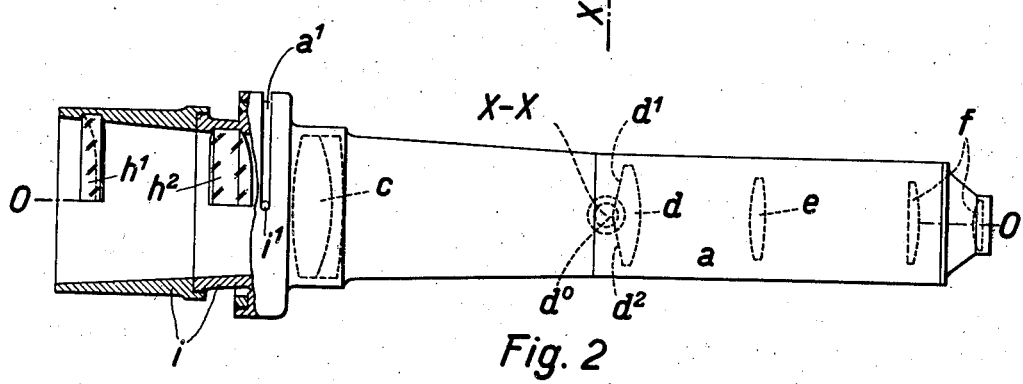
Figure 3:
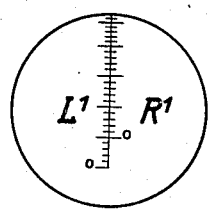
Figure 4:
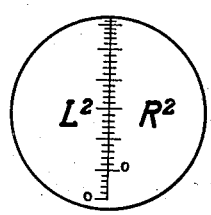
Figure 5:
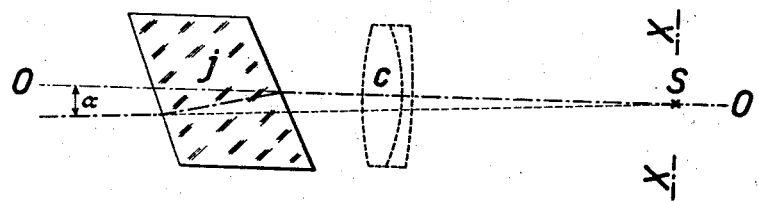
Figure 6:
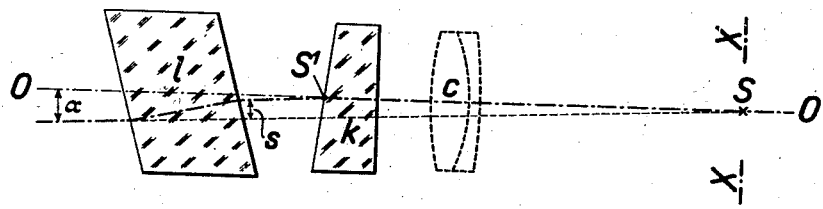
Figure 7:
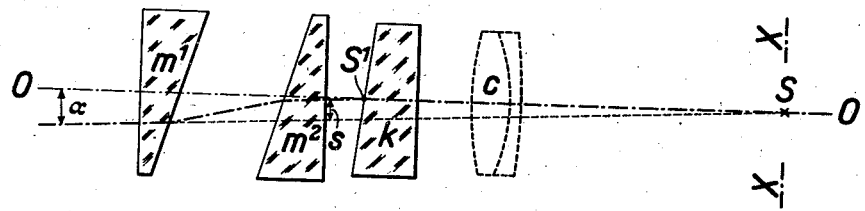
Figures 8, 9:
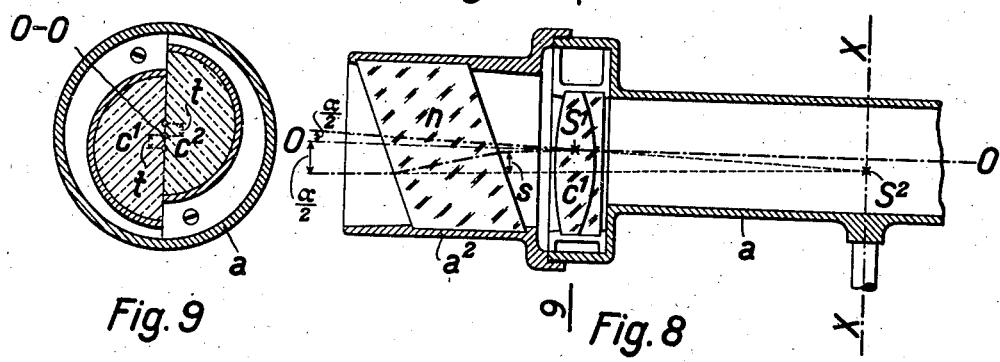

In the accompanying drawings Figures 1 and 2 illustrate a tacheometric telescope having in front of the one half of its objective a pair of wedges corresponding to the invention. Figures 1 and 2 show the telescope in front elevation in a vertical section along its optical axis and, respectively, in cross section, partly in a view and partly in a horizontal section along the optical axis. Figures 3 and 4 represent the images as are seen in the telescope of a vertical measuring staff used in range finding. Figures 5, 6, and 7 each represent an optical system corresponding to the invention, which is to be placed in front of the one objective half of a tacheometric telescope. Figure 8 shows in a vertical section along the optical axis the front part of a tacheometric telescope whose objective consists of two intersected and mutually displaced halves. Figure 9 shows these two halves in a transverse section along the section line drawn in Figure 8.

The tacheometric telescope according to Figures 1 and 2 is of the terrestric type. Its tube $a$ is mounted for rotation about a vertical axis X—X (the vertical axis of the telescope) by means of a pin $b$ which is assumed to be in a tripod bearing omitted in the drawings for the sake of simplicity. The telescope comprises an objective $c$, a collective $d$, a reversing lens $e$, and an ocular $f$. In that side of the collective $d$ which faces the objective $c$ are ground two plane surfaces $d^1$ and $d^2$ whose common intersecting line $d^0$ lies in the objective image plane of the telescope. This intersecting line $d^0$ is parallel to the vertical axis X—X and intersects the optical axis O—O of the telescope. The two surfaces $d^1$ and $d^2$ are symmetric relatively to the plane determined by these two axes and are so inclined towards this plane that the two images of the entrance pupil, which are equal to each other and are produced in the image plane of the entrance pupil (which plane lies near the reversing lens $e$ of the telescope), are displaced relatively to each other by half their diameter. In this image plane is provided a diaphragm $g$ whose free aperture $q^0$ has a diameter which is equal to half the diameter of these images of the entrance pupil. In front of the right half of the objective $c$ (seen from the ocular side of the telescope) is disposed a wedge system consisting of two parts, $h^1$ and $h^2$, that have an air space between them and whereof one is of flint and one of crown glass. These two parts cause the rays striking this objective half to be deviated relatively to the optical axis O—O into the plane determined by this axis and the vertical axis X—X by an angle $\alpha$ (the parallactic angle) and, on the other hand, they make the vertex of this angle lie in the point of intersection S of the vertical axis X—X and the optical axis O—O. The wedge system $h^1$, $h^2$ is mounted in a sleeve $i$ which is disposed on the tube $a$ of the telescope and permits of being turned about the optical axis O—O of the same. A pin $i^1$ of the sleeve $i$, which goes into a slot $a^1$ in the tube $a$, limits the turning movement of the sleeve $i$ to 180° in such a manner that the wedge system $h^1$, $h^2$ is in front of the right half of the objective when the sleeve $i$ takes the one end position (which is represented in the drawings) and in front of the left half of the objective when the sleeve $i$ takes the other end position. Consequently, the side SA of the parallactic angle $\alpha$, which does not coincide with the optical axis O—O, will go downward (as shown in the drawings) in the one case and upward in the other.

Figures 3 and 4 illustrate the double image of the measuring staff as are seen by the observer in the former and, respectively, in the latter of the said cases, whereby the single images $L^1$ and $L^2$ and, respectively, $R^1$ and $R^2$ are divided by sharp separating lines. The space between the zero lines of the two images corresponds to the distance of the measuring staff.

Figure 5 shows a thick wedge $j$ serving the purpose of being placed in front of one of the two halves of the objective $c$ (which is represented by dash lines) of a tacheometric telescope. The wedge $j$ has such a position relative to the objective $c$ and is so constructed that, like the wedge system $h^1$, $h^2$ according to Figures 1 and 2, it causes the rays striking the respective objective half to be deviated by the parallactic angle $\alpha$ relatively to the optical axis O—O of the telescope in the plane determined by this axis and the vertical axis X—X; this wedge displaces at the same time the vertex of the angle $\alpha$ into the point of intersection S of the optical axis O—O and the vertical axis X—X of the telescope.

Figure 6 differs from Figure 5 in that the thick wedge $j$ is substituted by a wedge $k$ and a plano-parallel plate $l$. The wedge deviates the oncoming rays by the parallactic angle $\alpha$, whereby the vertex $S^1$ of this angle is in the point of intersection of the optical axis O—O of the telescope and the front wedge surface. The plano-parallel plate $l$ in front of the wedge causes the side of the parallactic angle, which is inclined by the angle $\alpha$ towards the optical axis O—O, to be displaced by an amount $s$ and thus causes the vertex of this angle to be displaced from $S^1$ to the point of intersection S of the optical axis O—O and the vertical axis X—X of the telescope.

Figure 7 differs from Figure 6 only by the plano-parallel plate $l$ being substituted by two equal wedges $M^1$ and $M^2$ of opposite deviations, whose effect is similar to that of the plano-parallel plate $l$.

In Figures 8 and 9 $c^1$ and $c^2$ are the two halves of the objective of a tacheometric telescope. These two halves are rigidly disposed in the tube $a$ in such a manner that they are displaced relatively to each other in a direction parallel to the vertical axis X—X and that their axes are each at a distance $t$ from the optical axis O—O of the telescope and have an intermediate distance amounting to $2t$, whereby $t$ is given such a value that the rays supplied to each of these two halves are deviated to the optical axis O—O by half the value of the desired parallactic angle $\alpha$. The vertex of the parallactic angle lies in the point of intersection $S^1$ of the front principal plane of the objective $c^1$, $c^2$ and the optical axis O—O. The objective half $c^1$ has in front a plano-parallel plate $n$ which is fixed in a sleeve $a^2$ screwed to the tube $a$ and has such an effect that that side of the parallactic angle $\alpha$ which corresponds to this objective half is displaced by an amount $s$, which means that the vertex of this angle is displaced from $S^1$ to $S^2$, whereby $S^2$ is the point of intersection of the other side (which is elongated in the direction over $S^1$) of this angle and the vertical axis X—X.

I claim:

1. A tacheometric telescope rotatable about a vertical axis, containing optical members attached before at least one of the two halves of the telescope objective, the combination of these optical members and the objective, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

2. A tacheometric telescope rotatable about a vertical axis, containing optical members attached before at least one of the two halves of the telescope objective, these optical members, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

3. A tacheometric telescope rotatable about a vertical axis, containing a pair of wedges facing each other and attached before one of the two halves of the telescope objective, the two wedges having a space of air between them and, with respect to the exponents of refraction, the inclination of the surface towards the telescope axis, and the interstices between the different surfaces, measured in the axis of the telescope, being adapted to so deviate a ray traversing them and directed to the point of intersection of the said vertical and the telescope axis as to make this ray coincide with the telescope axis subsequently to its exit from the objective.

4. A tacheometric telescope rotatable about a vertical axis, containing a wedge attached before one of the two halves of the telescope objective, this wedge being adapted, with respect to the exponents of refraction, the inclination of the surface towards the telescope axis, and the interstices between the different surfaces, measured in the axis of the telescope, to so deviate a ray traversing it and directed to the point of intersection of the said vertical and the telescope axis as to make this ray coincide with the telescope axis subsequently to its exit from the objective.

5. A tacheometric telescope rotatable about a vertical axis, containing optical members attached before at least one of the two halves of the telescope objective, at least one of these members being adapted to provide parallel displacement of all rays, the combination of all these optical members and the objective, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

6. A tacheometric telescope rotatable about a vertical axis, containing optical members attached before at least one of the two halves of the telescope objective, one of these members being a plano-parallel plate inclined relatively to the optical axis of the telescope, the combination of all these optical members and the objective, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

7. A tacheometric telescope rotatable about a vertical axis, the two halves of the telescope objective being displaced relatively to each other at right angles to the axis of the telescope, optical members attached at least before one of the said two halves of the objective and adapted to provide parallel displacement of rays, the combination of all these optical members and the objective, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

8. A tacheometric telescope rotatable about a vertical axis, containing optical members so attached before at least the one of the two halves of the telescope objective as to be rotatable about the optical axis of the telescope through an angle of 180°, the combination of these optical members and the objective, with respect to the exponents of refraction, the inclination of the surface towards the telescope axis, and the interstices between the different surfaces, measured in the axis of the telescope, being adapted to so deviate two rays, which traverse the said two halves of the objective, respectively, and intersect in the said vertical axis, that these rays coincide with each other subsequently to their exit from the objective.

ALBERT KÖNIG.